April 14, 1925. 1,533,648
J. A. HAWKINSON
METHOD OF PREPARING SMOKED JOINT MEATS
Filed April 7, 1924     2 Sheets-Sheet 2
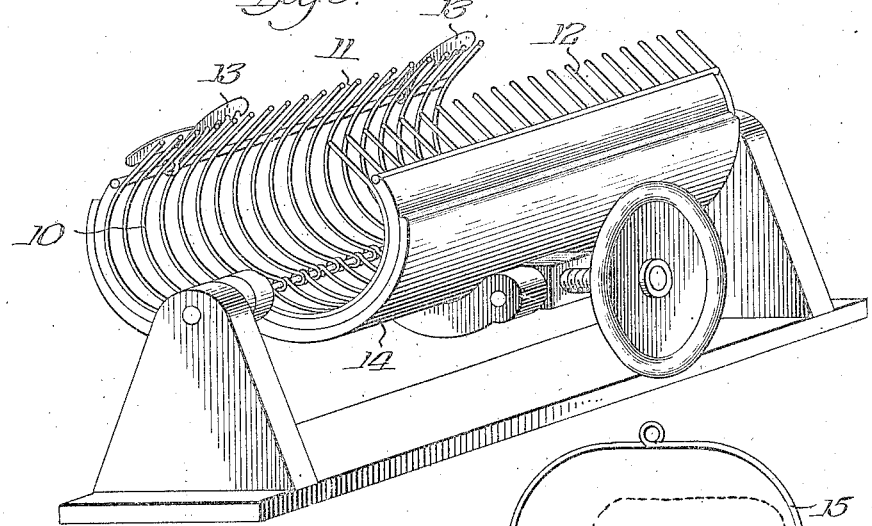
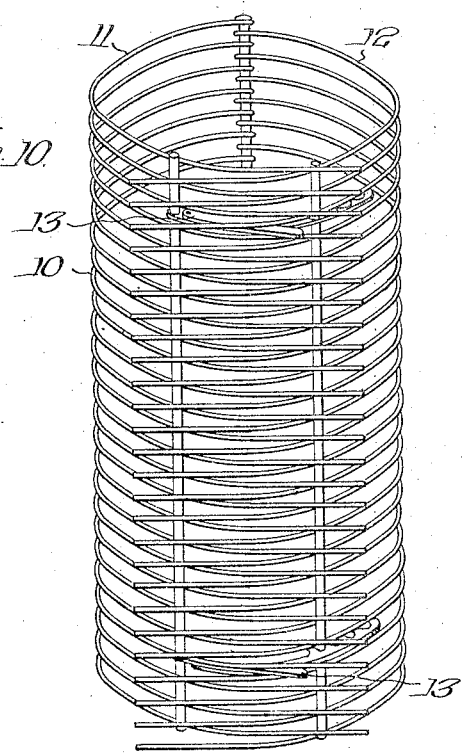
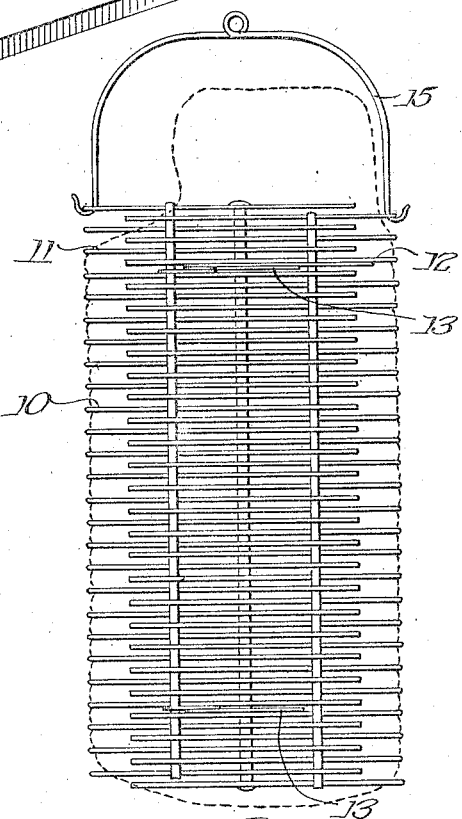
Inventor:
John A. Hawkinson
By Cromwell, Greist & Warden
Attys.

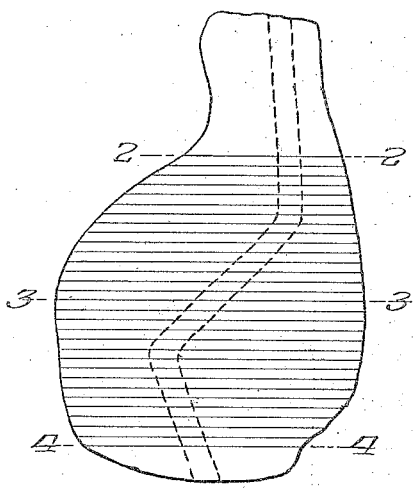
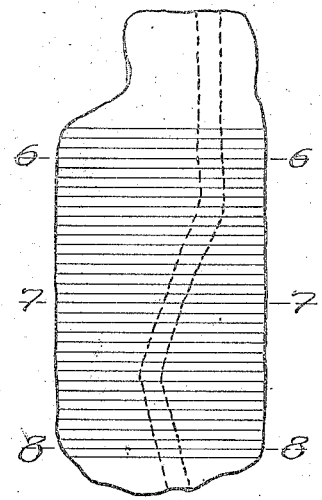
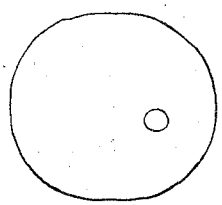
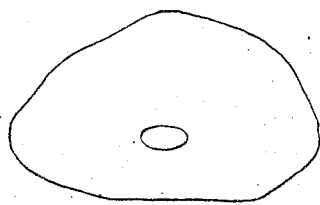
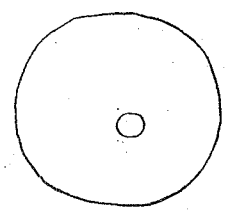
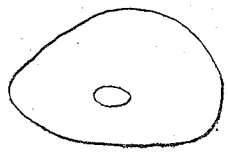
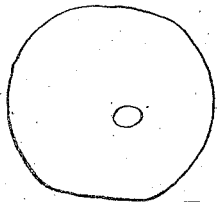

Patented Apr. 14, 1925.

1,533,648

UNITED STATES PATENT OFFICE.

JOHN A. HAWKINSON, OF NASHVILLE, TENNESSEE, ASSIGNOR TO ALLIED PACKERS, INCORPORATED, OF CHICAGO, ILLINOIS, A CORPORATION OF DELAWARE.

METHOD OF PREPARING SMOKED JOINT MEATS.

Application filed April 7, 1924. Serial No. 704,585.

*To all whom it may concern:*

Be it known that I, JOHN A. HAWKINSON, a citizen of the United States, residing at Nashville, in the county of Davidson and State of Tennessee, have invented certain new and useful Improvements in Methods of Preparing Smoked Joint Meats, of which the following is a specification.

The invention resides in a method of preparing smoked joint meats. The method is applicable to hams, shoulders and picnics, but for the purpose of explicit exemplification is hereinafter described in its application to hams.

The meat industry has heretofore experienced difficulty, in making profitable disposition of a certain class of hams, which class include some of the medium size hams and all of the large size hams. Such hams are not desirable from the viewpoint of the average consumer, since the same, uncut, are too large for family requirements, and cut, yield a number of slices which are either too elongated for family utensils or too large for family requirements.

Although this difficulty has been a serious handicap to the meat industry since the commercial advent of smoked joint meats, and, as such, has been the subject of much consideration on the part of those skilled in the preparation of meats, no practical solution of the same has been advanced prior to the method of the invention.

The method of the invention involves a permanent redisposition in the ham of the meat portions and the bone portions, whereby the longitudinally tapering and transversely elliptical form of the meat portions is converted into a more elongated and substantially cylindrical form, and the angulated arrangement of the bone portions is converted into a substantially straight-line arrangement.

The features of advantage which characterize a ham so prepared are numerous. The bulky appearance of the ham is minimized, and the slices obtainable from the same are greater in number, are substantially round instead of elliptical, are medium in size instead of large, are more nearly uniform in both shape and size, and contain substantially equal sections of bone.

The accompanying drawings are presented for the purpose of illustrating, first, the outstanding differences between a ham prepared in the ordinary manner and a ham prepared in accordance with the invention, and second, one of many mechanical instrumentalities which may be used in practicing the invention.

In the drawings—

Fig. 1 is a view of a ham which has been prepared in the ordinary manner;

Figs. 2, 3 and 4 are views of slices taken through the ham on the lines 2—2, 3—3 and 4—4 of Fig. 1;

Fig. 5 is a view of a ham which has been prepared in accordance with the invention;

Figs. 6, 7 and 8 are views of slices taken through the ham on the lines 6—6, 7—7 and 8—8 of Fig. 5;

Fig. 9 is a perspective view of one apparatus which may be used in practicing the invention;

Fig. 10 is a perspective view of one of the ham containers; and

Fig. 11 is a side view of a ham undergoing the preparation involved in the method of the invention.

Referring to the large ham illustrated in Figs. 1 to 4 inclusive, it will be observed that the same, as prepared in the ordinary manner, is bulky in appearance because of its tapering elliptical shape, and when cut yields variously proportioned slices which are for the most part undesirable from the viewpoint of the consumer.

Referring to the equally large ham illustrated in Figs. 5 to 8 inclusive, it will be observed that the same, as prepared in accordance with the invention, is less bulky in appearance because of its elongated cylindrical shape, and when cut yields a greater number of slices, all of which are desirable from the viewpoint of the consumer.

The method of the invention consists in subjecting the ham, after pickling and before smoking, to sufficient external pressure to convert the same into an elongated cylindrical form, and smoking the ham while the same is held in such form.

The method, more specifically stated, consists in placing the ham, after the same has been pickled to the usual extent and is in a flaccid condition, in a perforate non-elastic container of cylindrical form disposed within a press of corresponding form; closing the press until the ham within the container has been subjected to sufficient external pressure to convert the same into an elongated cylindrical form; securing the container tightly about the compressed ham and removing the same from the press; smoking the ham while encased under pressure in the container; and releasing the container when the ham has cooled and removing the finished product.

If desired, the ham may be removed from the container after the meat portions have permanently set but before the smoking is entirely completed, and given a finishing smoke. It is immaterial, in so far as the results achieved by the method are concerned, whether or not the ham is encased in the elastic fabric covering sometimes used during the smoking operation, but, if such a covering is used, surface marking by the container is practically eliminated. The ham, during the smoking operation, may be suspended in the usual manner from the shank, or may be suspended from the container, in which latter case an even more abrupt shaping of the shank is possible.

The finished ham, regardless of its original proportions, may be sliced even more advantageously than those hams which have heretofore been considered select for slicing, since the proportion of butt and shank waste is materially decreased, and a greater number of slices are obtainable and all of such slices are of substantially medium size and rounded shape.

While the foregoing description has to do particularly with the preparation of large hams, it is to be understood that the method of the invention is likewise applicable to hams of all sizes, and to shoulders and picnics.

The apparatus illustrated in Figs. 9 to 11 inclusive includes a wire container 10 having two semi-cylindrical sides 11 12 which may be brought together to any desired extent and latched in such closed positions by a plurality of spaced hooks 13, and a press 14 for subjecting the ham to the requisite pressure when in the container 10. If the ham is to be suspended from the container, a bail 15 may be used.

I claim:

1. A method of preparing smoked joint meats, which consists in subjecting the meat while in a flaccid condition on the articulated bone structure to a pressure sufficient to convert the same into a form which is substantially uniform in cross-sectional area throughout the greater portion of its length, and smoking the meat while in such form.

2. A method of preparing smoked joint meats, which consists in subjecting the meat while in a flaccid condition on the articulated bone structure to a pressure sufficient to convert the same into a substantially cylindrical form, and smoking the meat while in such form.

3. A method of preparing hams, which consists in subjecting the composite meat and articulated bone structure after pickling and before smoking to a pressure sufficient to convert the same into a form which is substantially uniform in cross-sectional area throughout the greater portion of its length, and smoking the ham while in such form.

4. A method of preparing hams, which consists in subjecting the composite meat and articulated bone structure after pickling and before smoking to a pressure sufficient to convert the same into a substantially cylindrical form, and smoking the ham while in such form.

5. A method of preparing hams, which consists in subjecting the composite meat and articulated bone structure after pickling and before smoking to a pressure sufficient to convert the ham into a substantially cylindrical form wherein the wide medial portions of the meat structure are transposed lengthwise of the form and the articulated portions of the bone structure are caused to assume positions more nearly lengthwise of the form, and smoking the ham while in such form.

6. A method of preparing hams, which consists in placing the composite meat and articulated bone structure after pickling and before smoking in a perforate non-elastic container of cylindrical form disposed within a press of corresponding form, closing the press until the ham within the container has been subjected to sufficient pressure to convert the same into an elongated, substantially cylindrical form, securing the container tightly about the compressed ham and removing the same from the press, smoking the ham while encased under pressure in the container, and releasing the container when the ham has cooled and removing the finished product.

In testimony whereof I have hereunto subscribed my name.

JOHN A. HAWKINSON.